US010134307B2

(12) United States Patent
Kirenko

(10) Patent No.: US 10,134,307 B2
(45) Date of Patent: Nov. 20, 2018

(54) SOFTWARE APPLICATION FOR A PORTABLE DEVICE FOR CPR GUIDANCE USING AUGMENTED REALITY

(71) Applicant: KONINKLIJKE PHILIPS N.V., Eindhoven (NL)

(72) Inventor: Ihor Olehovych Kirenko, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 442 days.

(21) Appl. No.: 14/548,969

(22) Filed: Nov. 20, 2014

(65) Prior Publication Data
US 2015/0170546 A1   Jun. 18, 2015

(30) Foreign Application Priority Data
Dec. 12, 2013   (EP) .................................... 13196891

(51) Int. Cl.
G09B 23/30   (2006.01)
G09B 23/28   (2006.01)
G06K 9/00   (2006.01)

(52) U.S. Cl.
CPC ....... *G09B 23/288* (2013.01); *G06K 9/00375* (2013.01); *G09B 23/30* (2013.01); *G06K 9/00912* (2013.01)

(58) Field of Classification Search
CPC ...... A61H 31/005; G09B 5/00; G09B 23/288; G09B 19/00
(Continued)

(56) References Cited

U.S. PATENT DOCUMENTS 7,190,999 B2    3/2007  Geheb et al.
8,317,519 B1   11/2012  Orlando
(Continued)

FOREIGN PATENT DOCUMENTS

DE    102011010556 A1    8/2011
WO       03101537 A1   12/2003
(Continued)

OTHER PUBLICATIONS

L. Kong, "Non-contact detection of oxygen saturation based on visible light imaging device using ambient light," Opt. Express 21, 17464-17471 (Jul. 15, 2013) https://www.osapublishing.org/oe/abstract.cfm?uri=oe-21-15-17464.*
(Continued)

*Primary Examiner* — Sam Yao
*Assistant Examiner* — Michael Humphrey

(57) ABSTRACT

A method for guiding a user in performing a Cardio-Pulmonary Resuscitation (CPR) procedure on a patient involving a user portable device comprising a camera, and a display. The method includes receiving a video of the patient captured by the camera, and processing the video to segment a chest region of the patient. A target position on the chest where to position hands for performing CPR is then determined, and this position is then shown on the display, hereby guiding the user in obtaining a suitable hand position for performing CPR. The method can be implemented as a software application in a personal portable device such as a smart phone, a tablet application software, a wearable computer with head-mounted display etc. Further, the video of the scene captured by the camera can be processed to provide information regarding functional quality of CPR, e.g. compression frequency and depth, during the CPR procedure. Further, vital signs of the patient such as heart rate, respiration rate, and blood oxygen saturation may be
(Continued)

derived by image processing on the video, i.e. without any dedicated medical sensors. All such information can be provided as visual and/or audible feedback to the user during the CPR procedure, thus improving CPR effectiveness, also in case of an untrained user.

12 Claims, 2 Drawing Sheets

(58) Field of Classification Search
USPC .......................................................... 434/265
See application file for complete search history.

(56) References Cited

U.S. PATENT DOCUMENTS

| | | | | |
|---|---|---|---|---|
| 8,734,161 | B1* | 5/2014 | Centen | G09B 23/288 434/262 |
| 2007/0043585 | A1* | 2/2007 | Matos | G06Q 50/22 705/2 |
| 2009/0270931 | A1* | 10/2009 | Liden | A61H 31/005 607/5 |
| 2011/0040217 | A1* | 2/2011 | Centen | A61B 5/0064 601/41 |
| 2011/0284004 | A1* | 11/2011 | Silver | A61B 5/087 128/205.13 |
| 2012/0045742 | A1* | 2/2012 | Meglan | G09B 23/28 434/268 |
| 2012/0113209 | A1* | 5/2012 | Ritchey | H04N 5/2254 348/14.02 |
| 2012/0195473 | A1 | 8/2012 | De Haan et al. | |
| 2012/0302289 | A1 | 11/2012 | Kang | |
| 2013/0252218 | A1* | 9/2013 | Sweet | G09B 23/288 434/265 |
| 2013/0278631 | A1* | 10/2013 | Border | G02B 27/017 345/633 |
| 2014/0002241 | A1* | 1/2014 | Elghazzawi | H04W 76/007 340/8.1 |
| 2014/0005506 | A1* | 1/2014 | Elghazzawi | A61B 5/0205 600/324 |
| 2014/0031696 | A1 | 1/2014 | Schmeitz et al. | |
| 2014/0039359 | A1* | 2/2014 | Madanat | A61N 1/39 601/15 |
| 2014/0050375 | A1* | 2/2014 | Baker | G06F 19/3481 382/128 |
| 2014/0078137 | A1* | 3/2014 | Peddi | G09B 19/0038 345/419 |
| 2014/0342330 | A1* | 11/2014 | Freeman | G09B 23/288 434/265 |
| 2014/0342331 | A1* | 11/2014 | Freeman | G09B 23/288 434/265 |
| 2015/0087257 | A1* | 3/2015 | Balram | H04W 4/12 455/404.1 |
| 2015/0194074 | A1* | 7/2015 | Chen | G09B 23/288 434/265 |
| 2015/0325148 | A1* | 11/2015 | Kim | G09B 5/02 434/265 |
| 2015/0351647 | A1* | 12/2015 | Dantu | A61B 5/02438 601/41 |
| 2016/0133160 | A1* | 5/2016 | Packer | G09B 23/288 434/267 |
| 2016/0314673 | A1* | 10/2016 | Eyring | G08B 21/06 |

FOREIGN PATENT DOCUMENTS

| | | |
|---|---|---|
| WO | 2011100534 A1 | 8/2011 |
| WO | 2012140531 A1 | 10/2012 |
| WO | 2013030739 A1 | 3/2013 |
| WO | 2013128345 A1 | 9/2013 |
| WO | 2013136231 A1 | 9/2013 |
| WO | 2014045217 A1 | 3/2014 |
| WO | 2014124855 A1 | 8/2014 |
| WO | 2014131812 A1 | 9/2014 |
| WO | 2014131850 A1 | 9/2014 |

OTHER PUBLICATIONS

N Park. (2013) Projected AR-Based Interactive CPR Simulator. In: Shumaker R. (eds) Virtual, Augmented and Mixed Reality. Systems and Applications. VAMR 2013. Lecture Notes in Computer Science, vol. 8022. http://link.springer.com/chapter/10.1007/978-3-642-39420-1_10.*
Park et al: "Projected AR-Based Interactive CPR Simulator"; VAMR/HCII 2013, Part II, LNCS 8022, pp. 83-89, 2013.
Singh: Augmented Reality Interfaces:; IEEE Internet Computing, Published by IEEE Computer Society, 2013, pp. 1-5.
Education & Research Feature—University of Arkansas Medical School: Physician Advocates Medical Innovation With Google Glass, Retrieved From the Internet At http://www.uamshealth.com/newsnid=5351sid=1&nid=9903&cid=6, on Apr. 23, 2014.

* cited by examiner

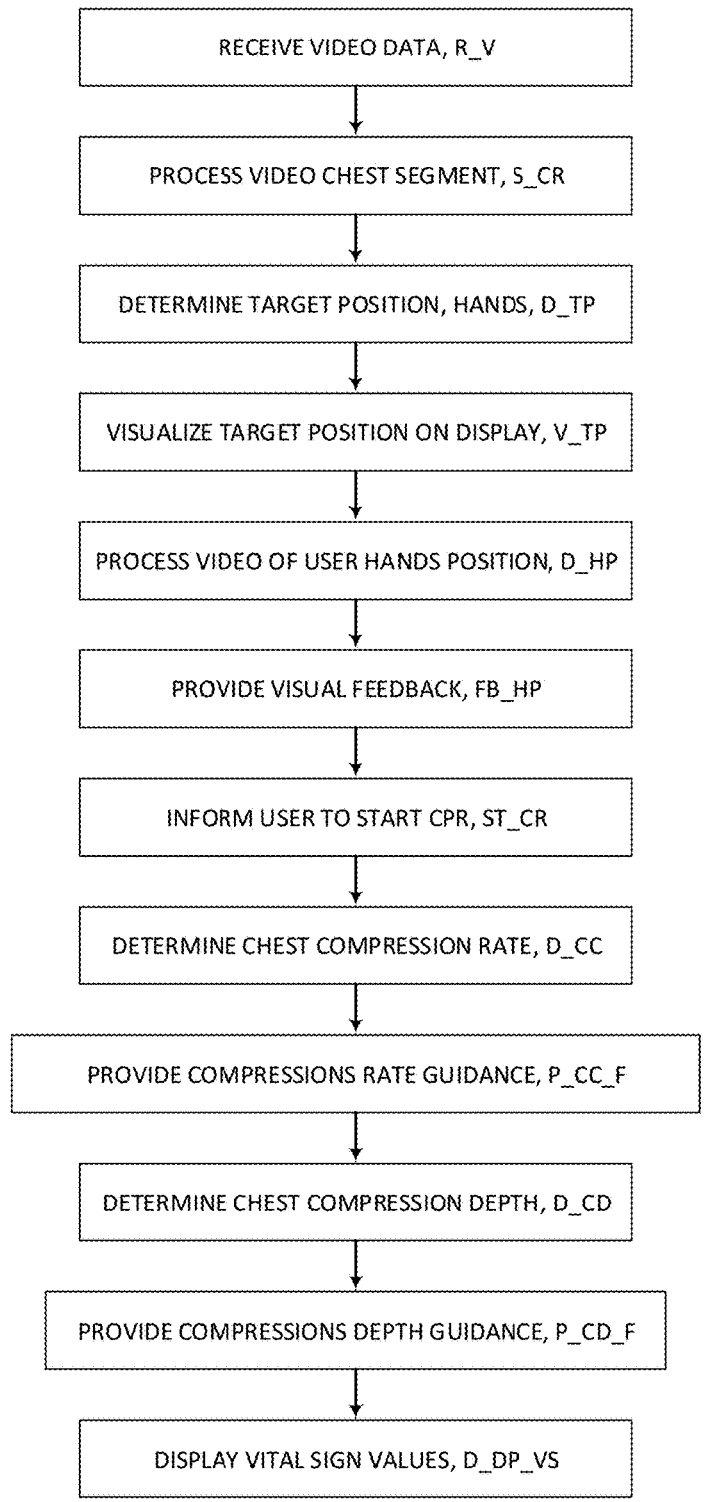

SOFTWARE APPLICATION FOR A PORTABLE DEVICE FOR CPR GUIDANCE USING AUGMENTED REALITY

FIELD OF THE INVENTION

The present invention relates to the field of medical assistive devices and methods. Especially, the invention provides a method and a device for guidance of a user in performing manual Cardio-Pulmonary Resuscitation (CPR).

BACKGROUND OF THE INVENTION

CPR is an emergency procedure performed in an effort to manually preserve intact brain function until further measures are taken to restore spontaneous blood circulation and breathing in a person in cardiac arrest. CPR involves chest compressions at least 5 cm (2 inches) deep and at a rate of at least 100 per minute in an effort to create artificial circulation by manually pumping blood through the heart. Current recommendations place emphasis on high-quality chest compressions over artificial respiration. A simplified CPR method involving chest compressions only is recommended for untrained rescuers. Compression-only (hands-only or cardio cerebral resuscitation) CPR is a technique that involves chest compressions without artificial respiration. It is recommended as the method of choice for the untrained rescuer or those who are not proficient as it is easier to perform and instructions are easier to give over the phone.

Audible and visual prompting may improve the quality of CPR and prevent the decrease of compression rate and depth that naturally occurs with fatigue, and to address this potential improvement, a number of devices have been developed to help improve CPR technique.

Currently, these items can be devices to be placed on top of the chest, with the rescuers hands going over the device, and a display or audio feedback giving information on depth, force or rate, or in a wearable format such as a glove. E.g. U.S. Pat. No. 8,317,519 B1 discloses a portable CPR metronome to assist a user in performing CPR according to medically accepted guidelines using audible and visible prompts. Several published evaluations show that such devices may improve the performance of chest compressions. As well as use during actual CPR on a cardiac arrest victim, which relies on the rescuer carrying the device with them, these devices can also be used as part of training programs to improve basic skills in performing correct chest compressions.

Automatic CPR exist which are capable of providing the mechanical force on the patient's chest according to a preprogrammed scheme, when properly setup by a user. However, such devices are only within reach on few locations.

There are several software applications for personal portable devices on the market to assist during CPR. However, all of them either contain only instructions and a quick emergency call to a professional medical help, or require an additional dedicated device to give a feedback on quality of CPR performance. Such software applications may be useless in many real situations, since there is usually no time to go through the instructions on a portable device.

SUMMARY OF THE INVENTION

Thus, it would be advantageous to provide a method and a device capable of providing a personalized guidance to any untrained person before and during CPR. Further, it would be advantageous for practical use, that the method can be performed with a device which is at hand without losing critical time searching for a dedicated assistive device. Further, it would be advantageous for practical use, that the method can adjust instructions "on the fly" based on vital body signals measured from a subject, using the same device, without the need to attach extra body sensors.

In a first aspect, the invention provides a method for guiding a user in performing a CPR procedure on a patient involving a portable device comprising a camera, and a display, the method comprising:
   a) receiving data representing a video of the patient captured by the camera,
   b) processing the video to segment a chest region of the patient,
   c) determining a target position on the chest region where to position hands for performing CPR, and
   d) visualizing the target position on the chest region on the display so as to guide the user in obtaining a suitable hand position for performing the CPR procedure.

Such method is advantageous, since it may be implemented as a software application on any portable device, such as a smart phone, a tablet etc. with a camera and a display. Such device is normally within reach for most people at any time, and they are familiar with using it. Thus, with the application installed on the portable device, an untrained user will waste no time searching for a dedicated hardware device for CPR guidance or an automatic CPR device, but the user can immediately start the application and receive guidance. Therefore, the method is applicable for any untrained user without any CPR experience, provided that the software application is available on their portable device, e.g. a smart phone. The video assisted guidance towards correct hand position for performing CPR is crucial for performing effective CPR. By further image processing on the video signal from the camera, the method may include identifying the user's hands. Hereby it is possible to more effectively provide an interactive feedback to the user regarding correct hand position, e.g. determining and provide audible/visual feedback to the user that a suitable hand position has been obtained, and the CPR procedure with chest compressions can begin.

Thus, in other words, the method utilizes a personal portable device for providing CPR guidance by an augmented reality approach. This may assist an untrained user in quickly positioning hands on the correct position on the patient's chest for correctly performing CPR. Further, a feedback can be provided to the user during performing the CPR procedure. This may include both a functional feedback regarding the functional quality of the CPR performance, but also vital signs of the patient. All such feedbacks may be provided by image processing performed on the video of the scene captured by the camera, i.e. without any further dedicated medical devices.

In the following a number of different sub-aspects are described.

It may be especially advantageous to use a portable device in the form of a device including a head-mounted display, optionally also with a camera. Such device allows the user to see the patient, allows the camera to capture a live video of the same scene that the user sees, and simultaneously overlay guidance on the display, i.e. including in one step to visualize the target area where to position hands for optimal CPR. As a specific example on such portable device with a head-mounted display is Google Glass®, which is basically a pair of glasses with a built in computer, a camera, and a display based on a projector capable of projecting an image on at least one of the glasses. However, of course the invention may be used with many other types of portable devices, in principle any portable device having a camera and a display.

In case the portable device is a smart phone, a tablet or similar portable device, it may be preferred to on-line display the video captured by the camera on the display. Visual feedback provided to the user can then be shown on the display overlaid on the video, e.g. it may facilitate the guidance for correct hand position for CPR, when the user can see his/her own hands on the display along with guiding graphics and/or text overlaid on the video. Using a head-mounted display device, the same may be obtained by the user watching the scene directly with his/her eyes, while extra information is overlaid using the head-mounted display. With a camera mounted on the head-mounted display, it is possible to align the overlay graphics with the scene seen directly by the user, e.g. guiding arrows for moving hands towards a target position etc.

The method may comprise providing the user with guidance by means of feedback using an augmented reality approach. In general, the guidance and feedback may be visualized to the user on the display using text as well as symbols etc. In addition, audible signals and/or voice information may be used as feedback.

The processing of the video in step b) is preferably performed by a processor in the portable device. The same applies to any further processing of the video, thus allowing the internal processor in the portable device to perform the image processing. Hereby, any delay or interrupts due to poor connection introduced by transmitting the video signal to an external server for performing the processing is eliminated.

The visualizing in step d) may be provided by overlaying graphics on the display to guide the user to position his/her hands on the target position on the chest region. Such augmented reality approach.

The method may comprise processing of the video to calculate at least one measure indicative of functional CPR performance during the CPR procedure, and providing feedback to the user in response to said at least one measure indicative of functional CPR performance. Especially, the method may comprise calculating, in response to the video, at least one of: a measure of depth of compressions of the patient's chest, and a frequency of compressions of the patient's chest, during the user performing the CPR procedure. Visual and/or audible feedback may be provided to the user by comparing calculated values representative of the CRP performance with predetermined target values. E.g. the user may be informed to increase speed in case the CPR is performed too slowly.

Image processing methods exist that allow automatic detection of chest area of a patient, thus also allowing determining a target area for the user to position his/her hands for performing CPR. The method may comprise processing the video to identify a position of the user's hands, and providing visual feedback to the user on the display so as to guide the user to move his/her hands towards the target position.

The method may comprise processing the video to calculate at least one vital sign parameter of the patient indicative of a physical state of the patient, and providing guidance to the user in response to said at least one vital sign parameter of the patient. By 'vital sign parameter' is understood a health state parameter indicative of a status of at least one life critical parameter for the patient. Of course the purpose of performing CPR is to provide a stable heart rate, and thus it may be considered important to provide feedback to the user performing CPR if a stable heart rate is detected, e.g. the user may be guided to pause performing CPR, in case a heart rate above a predetermined threshold value is detected. Especially, the said processing of the video may comprise processing the video to calculate a measure of at least one of: a heart rate of the patient, and a respiration rate of the patient. Image processing methods exist that allow a robust and viewing angle independent determination of the heart rate and respiration rate of the patient in response to a video showing the skin of the patient. Thus, even without dedicated medical hardware, it is possible to evaluate the user's efforts in performing CPR and to provide the user with feedback accordingly, e.g. whether to continue or to pause CPR. As one further example of a vital sign parameter, said processing of the video may comprise processing the video to calculate a measure of blood oxygen saturation of the patient.

The method may comprise providing visual guidance on the display to the user in response to at least one of: a measure indicative of functional CPR performance, and a measure of a vital sign parameter of the patient. Preferably, the method comprises providing visual guidance on the display to the user in response to both of: a measure indicative of functional CPR performance, and a measure of a vital sign parameter of the patient.

The method may comprise providing audible guidance to the user in response to at least one of: a measure indicative of functional CPR performance, and a measure of a vital sign parameter of the patient. Such audible guidance may comprise artificial signals and/or voice guiding or coaching instructions. The audible guidance may be provided by a loudspeaker in the portable device and/or by earphones or headphones connected to the portable device.

The method may comprise an initial step of processing the video to calculate at least one vital sign parameter of the patient indicative of a physical state of the patient, processing said at least one vital sign parameter according to a predetermined algorithm to determine if CPR should be performed, and providing the user with feedback accordingly. Thus, a first step after starting a software application, the portable device may instruct the user to point the camera on the patient, thus allowing image processing to calculate e.g. heart beat and/or respiration rate of the patient. Accordingly, if it is determined that CPR should be initiated, the user can be automatically guided towards the mentioned guiding steps for positioning hands correctly for CPR.

The method may comprise processing the video comprising estimating a pose of the patient, and determine any (abnormal) motion using a camera-based actigraphy.

In a second aspect, the invention provides a computer program adapted to cause a portable device comprising a camera, and a display, to perform:
 a) receiving data representing a video of the patient captured by the camera,
 b) processing the video to segment a chest region of the patient,
 c) determining a target position on the chest region where to position hands for performing CPR, and
 d) visualizing the target position on the chest region on the display so as to guide the user in obtaining a suitable hand position for performing the CPR procedure.

Such computer program is thus capable of performing the steps of the method according to the first aspect which can be implemented in software, especially as a software application designed for the portable device. The computer program may especially be present on a non-transitory computer readable storage medium, or it may be loaded into memory of a processor of the portable device arranged to execute the program. The computer program may be provided for downloading to the portable device via the internet or via any wireless network.

In a third aspect, the invention provides a portable device comprising a processor, a camera, and a display, wherein the portable device is configured for:
a) receiving data representing a video of the patient captured by the camera,
b) processing the video to segment a chest region of the patient,
c) determining a target position on the chest region where to position hands for performing CPR, and
d) visualizing the target position on the chest region on the display so as to guide the user in obtaining a suitable hand position for performing the CPR procedure.

Especially, the portable device may comprise one of: a mobile phone e.g. a smartphone, a tablet, and a wearable computer with an optical head-mounted display. Especially, the portable device may be a wearable computer with an optical head-mounted display, and a camera designed to capture a video of the same scene as seen by the eyes of the user wearing the wearable computer. The product Google Glass® is an example of such wearable computer.

The camera in portable device may be any normal camera smart phones and tablets etc. However, the camera may comprise Time-of-Flight, thermo, 3D capabilities which may provide additional advantages regarding detecting of various camera-based parameters. However, still there exists robust algorithms capable of calculating vital signs of a person based on images from a normal camera as forming part of regular smart phones, tablet etc.

It is appreciated that the same advantages and embodiments of the first aspect apply as well for the second and third aspect. In general the first, second, and third aspects may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 4 illustrates steps of a method embodiment.

DESCRIPTION OF EMBODIMENTS

Figure 1:
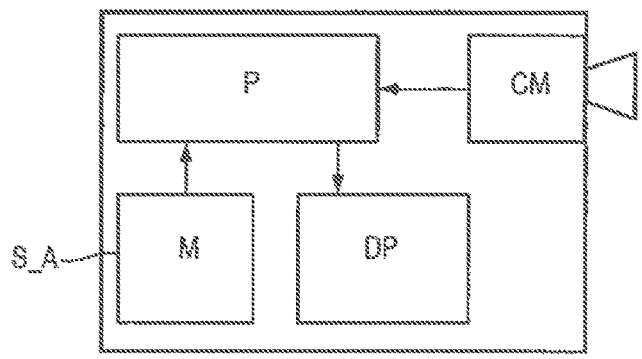
FIG. 1 illustrates a portable device, e.g. a smart phone, on which a software application implementing the method embodiment has been downloaded.

FIG. 1 illustrates basic parts of a device on which a software application S_A implementing the method according to the invention has been stored in a memory M, e.g. downloaded from a wired or wireless source. The device comprises a camera CM arranged to capture a video of a patient, i.e. provide a data stream of images which are processed by a processor P connected to and capable of providing a visual output on a display DP. The device may be a smart phone, a tablet. However, it may be preferred that the device is a wearable computer with a head-mounted display, especially a product such as Google Glass® or the like, or at least comprises a wearable device part with a head-mounted display PD and a camera CM, thus allowing the user to have both hands free for performing CPR and still can watch the display DP.

The software application S_A comprises a program code adapted to cause the processor P to perform the method according to the invention, i.e. to receive data representing a video of the patient captured by the camera CM, to process the video to segment a chest region of the patient by means of applying image processing algorithms to identify characteristic shapes indicative of the human chest. Then, a target position on the chest region is determined, e.g. based on a pre-stored position on a model of the human chest, where to position hands for performing CPR. The target position on the chest region is then visualized on the display so as to guide the user in obtaining a suitable hand position for performing the CPR procedure. E.g. the video may be processed with the purpose of identifying the user's hands, so as to be able to more clearly indicate to the user, in response to the position of the user's hands, which direction to move his/her for obtaining the target position.

Preferably, the software application S_A also comprises using the captured video for calculating vital signs parameters of the patient, e.g. based on photoplethysmographic image processing to determine heart rate, and possibly also respiration rate of the patient. This information is preferably visually provided to the user on the display, e.g. using overlay graphics that may include text and photos.

Preferably, the software application S_A provides the user with an augmented reality feedback on both a pre CPR procedure, including guidance towards correct hand position on the patient's chest, as well as feedback on e.g. speed and compression depth of the CPR performance.

Figure 2A:
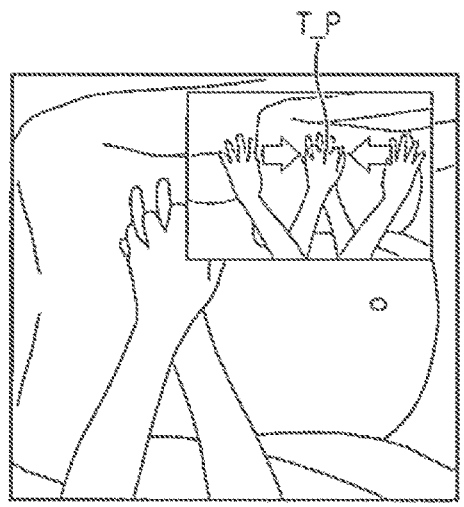
FIGS. 2a and 2b illustrate examples of visual feedback to a user as overlaid visual guiding to the user for positioning hands correctly for CPR, and for providing feedback during performing CPR.
Figure 2B:
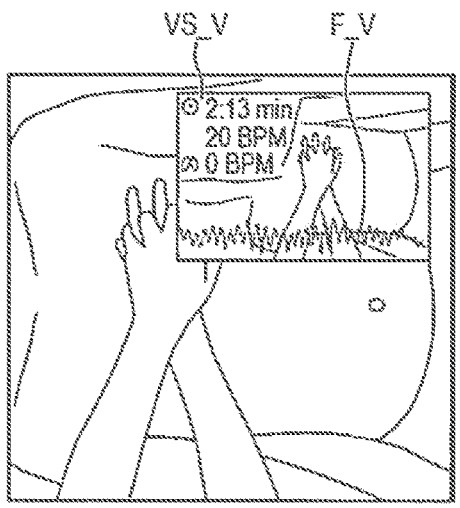

FIGS. 2a and 2b show two different examples of images shown on the display of the portable device. Both show an image with guidance information overlaid onto the video captured by the camera, or simply overlaid onto what the user directly sees, in case of a head-mounted display.

FIG. 2a shows the torso of the patient with the user's hands positioned at the target position for performing CPR. The small overlaid image indicates the target position (target region) T_P for hand position for CPR with graphics as well as symbols for two arms, as shown. The arms symbol may be animated to guide the user in obtaining the correct position of his/her hands before starting CPR compressions.

FIG. 2b shows another image, still with the torso of the patient with the user's hand positioned thereon. This image is shown on the display during the user performing CPR, and as seen an overlaid image includes numbers and symbols indicating calculated vital sign values VS_V for the patient based on image processing of the video captured by the camera. Here the vital sign values VS_V shown are heart rate and respiration rate, both shown with the unit beat per minute. Further, the upper value shown is the time elapsed since start of the CPR procedure. Further, a graph is shown indicating a functional quality value F_V of the CPR performance. The graph indicates time along the horizontal axis, and the applied force along the vertical axis. Both of these parameters can be calculated based on image processing of the video captured by the camera. The graph provides the user with feedback regarding the CPR effort, both the timing and the applied force. Further, graphics, text, and/or a voice may be used to inform the user in case the timing and force is outside a predetermined range, so as to guide the user towards a more effective CPR.

Figure 3:
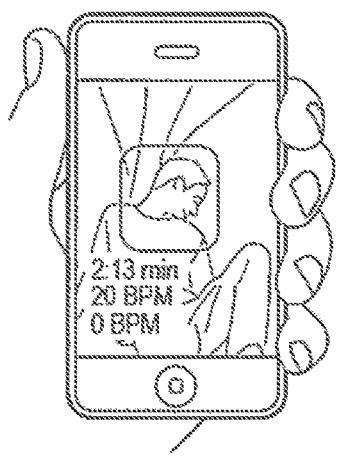
FIG. 3 illustrates an example of a display for an initial step of providing a user with visual feedback upon capturing a video of a patient and providing vital signs in response.

FIG. 3 shows an example of an initial image on the display after having started the software application on the portable device. The user is asked to direct the camera to capture a video of the patient, here shown as the patient's face, and the captured video is processed to measure heart rate and respiration rate of the patient, and possibly also blood oxygen saturation SpO$_2$ using vital signs camera image processing as mentioned above. Further, the video may be processed to estimate a pose of a person and (abnormal) motion using a camera-based actigraphy. In case no breathing is detected, the software application may automatically start the real-time CPR guidance.

FIG. 4 shows a block diagram of steps of an embodiment of a method for guiding a user in performing a CPR procedure on a patient. The method involves a user portable device comprising a camera, and a display, and a processor in the portable device executes a software application downloaded in a memory of the portable device. It is assumed that the user points the camera towards a patient to capture a video covering at least the patient's torso.

The method comprises receiving data representing the video of the patient captured by the camera R_V. Next step is processing the video to segment a chest region of the patient S_CR, i.e. processing the video according to a predetermined image processing algorithm to segment characteristic feature of the human chest. Next, a target position is determined on the chest region or area D_TP where the user is supposed to position his/her hands for performing efficient CPR. The target region is then visualized on the display V_TP, e.g. as overlaid graphics on the live video which is also shown on the display. Hereby, the user is guided in obtaining a suitable hand position for performing the CPR procedure. Further, the method embodiment comprises detecting position of the user's hands D_HP using image processing on the video from the camera. In response to this hand position detection, feedback to the user is given including visual and/or audible guidance in case the position is wrong FB_HP. When a proper position has been detected, the user may be informed to start applying CPR, ST_CR. During the CPR procedure, image processing is applied to the video to determine a rate of chest compressions DSC by analysing the motion of the user's hands. In case the frequency should be increased or decreased to be within a target range, visual and/or audible feedback is provided to the user P_CC_F. Further, the depth of the chest compressions is analyses by applying image processing on the video from a camera D_CD. Feedback to the use is provided whether the depth should be increased or decreased P_CD_F, including visual and/or audible feedback. Still further, the video is processed to determine vital signs of the patient, e.g. including heartbeat, respiration rate, and possibly also blood oxygen saturation, and the determined vital sign values are visualized to the user on the display as displayed numbers D_DP_VS.

To sum up, the invention provides a method for guiding a user in performing a Cardio-Pulmonary Resuscitation (CPR) procedure on a patient involving a user portable device comprising a camera, and a display. The method includes receiving a video of the patient captured by the camera, and processing the video to segment a chest region of the patient. A target position on the chest where to position hands for performing CPR is then determined, and this position is then shown on the display, hereby guiding the user in obtaining a suitable hand position for performing CPR. The method can be implemented as a software application in a personal portable device such as a smart phone, tablet application software, a wearable computer with head-mounted display etc. Further, the video of the scene captured by the camera can be processed to provide information regarding functional quality of CPR, e.g. compression frequency and depth, during the CPR procedure. Further, vital signs of the patient such as heart rate, respiration rate, and blood oxygen saturation may be derived by image processing on the video, i.e. without any dedicated medical sensors. All such information can be provided as visual and/or audible feedback to the user during the CPR procedure, thus improving CPR effectiveness, also in case of an untrained user.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for guiding a user in performing a Cardio-Pulmonary Resuscitation procedure on a patient involving a portable device comprising a camera, and a display, the method comprising
   a) receiving data representing a video of the patient captured by the camera,
   b) processing the video to segment a chest region of the patient,
   c) determining a target position on the chest region where to position hands for performing Cardio-Pulmonary Resuscitation, and
   d) visualizing the target position on the chest region by displaying the video of the patient overlaid with an image of the determined target position on the display so as to guide the user in obtaining a suitable hand position for performing the Cardio-Pulmonary Resuscitation procedure,
wherein the overlaying further comprises graphics symbols of two arms, wherein the graphics symbols of two arms are animated to guide the user in obtaining a correct hand position for performing the Cardio-Pulmonary Resuscitation procedure.

2. Method according to claim 1, wherein said processing of the video in step b) is performed by a processor in the portable device.

3. Method according to claim 1, comprising processing the video to calculate at least one measure indicative of functional Cardio-Pulmonary Resuscitation performance during the Cardio-Pulmonary Resuscitation procedure, and providing feedback to the user in response to said at least one measure indicative of functional Cardio-Pulmonary Resuscitation performance.

4. Method according to claim 3, comprising calculating, in response to the video, at least one of: a measure of depth of compressions of the patient's chest, and a frequency of compressions of the patient's chest, during the user performing the Cardio-Pulmonary Resuscitation procedure.

5. Method according to claim 1, comprising processing the video to calculate at least one vital sign parameter of the patient indicative of a physical state of the patient, and providing guidance to the user in response to said at least one vital sign parameter of the patient.

6. Method according to claim 1, comprising providing visual guidance on the display to the user in response to at least one of: a measure indicative of functional Cardio-Pulmonary Resuscitation performance, and a measure of a vital sign parameter of the patient.

7. Method according to claim 1, comprising providing audible guidance to the user in response to at least one of: a measure indicative of functional Cardio-Pulmonary Resuscitation performance, and a measure of a vital sign parameter of the patient.

8. Method according to claim 1, comprising an initial step of processing the video to calculate at least one vital sign parameter of the patient indicative of a physical state of the patient, processing said at least one vital sign parameter according to a predetermined algorithm to determine if Cardio-Pulmonary Resuscitation should be performed, and providing the user with feedback accordingly.

9. Method according to claim 1, comprising processing the video to identify a position of the user's hands, and providing visual feedback to the user on the display so as to guide the user to move his/her hands towards the target position.

10. A computer program as embodied in a non-transitory computer readable medium, and adapted to cause a portable device comprising a camera, and a display, to perform:
   a) receiving data representing a video of the patient captured by the camera,
   b) processing the video to segment a chest region of the patient,
   c) determining a target position on the chest region where to position hands for performing Cardio-Pulmonary Resuscitation, and
   d) visualizing the target position on the chest region by displaying the video of the patient overlaid with an image of the determined target position on the display so as to guide the user in obtaining a suitable hand position for performing the Cardio-Pulmonary Resuscitation procedure, wherein the overlaying further comprises graphics symbols of two arms which are animated to guide the user in obtaining a correct hand position for performing the Cardio-Pulmonary Resuscitation procedure.

11. A portable device comprising a processor, a camera, and a display, wherein the portable device is configured for:
   a) receiving data representing a video of the patient captured by the camera,
   b) processing the video to segment a chest region of the patient,
   c) determining a target position on the chest region where to position hands for performing Cardio-Pulmonary Resuscitation, and
   d) visualizing the target position on the chest region by displaying the video of the patient overlaid with an image of the determined target position on the display so as to guide the user in obtaining a suitable hand position for performing the Cardio-Pulmonary Resuscitation procedure, wherein the overlaying further comprises graphics symbols of two arms, wherein the graphics symbols of two arms are animated to guide the user in obtaining a correct hand position for performing the Cardio-Pulmonary Resuscitation procedure.

12. Portable device according to claim 11, comprising one of: a mobile phone, a tablet, and a wearable computer with an optical head-mounted display.

* * * * *